Oct. 4, 1966 F. K. BUELOW ET AL 3,277,289
LOGIC CIRCUITS UTILIZING A CROSS-CONNECTION BETWEEN COMPLEMENTARY OUTPUTS
Filed Dec. 31, 1963 7 Sheets-Sheet 1
FIG. 1
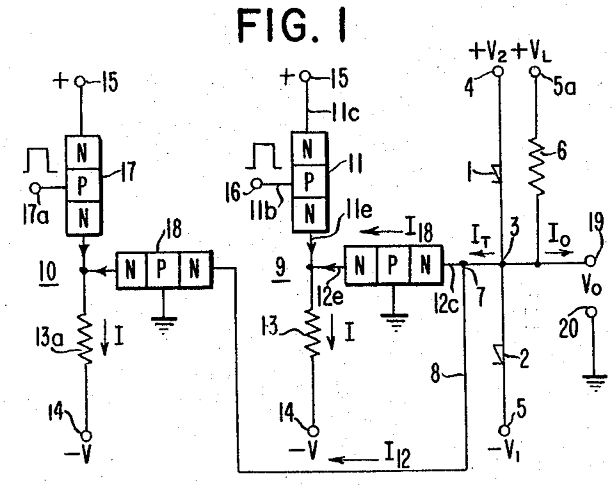
FIG. 2
| 16 | 17a | $I_{12}$ | $I_{18}$ | $I_T$ | AND $V_o$ | OR $V_o$ |
|---|---|---|---|---|---|---|
| 0 | 0 | 1 | 1 | 2 | 0 | 0 |
| 0 | 1 | 1 | 0 | 1 | 0 | 1 |
| 1 | 0 | 0 | 1 | 1 | 0 | 1 |
| 1 | 1 | 0 | 0 | 0 | 1 | 1 |
FIG. 3 FIG. 4
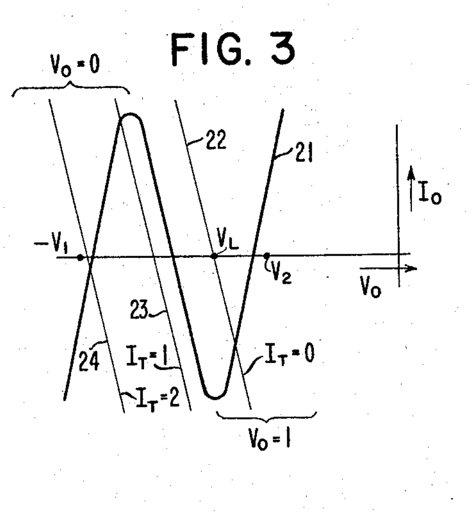
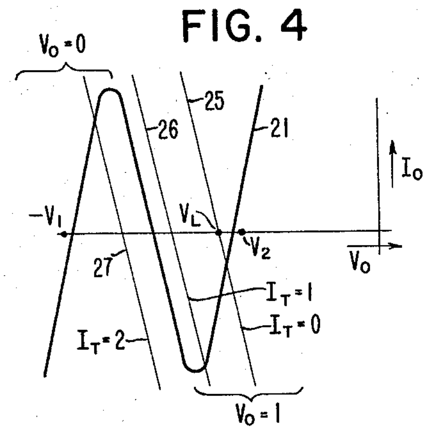
FIG. 5
| X | Y | Z | $I'_T$ | SUM | $I_T$ | CARRY |
|---|---|---|---|---|---|---|
| 0 | 0 | 0 | 2 | 0 | 3 | 0 |
| 0 | 0 | 1 | 3 | 1 | 2 | 0 |
| 0 | 1 | 0 | 3 | 1 | 2 | 0 |
| 0 | 1 | 1 | 2 | 0 | 1 | 1 |
| 1 | 0 | 0 | 3 | 1 | 2 | 0 |
| 1 | 0 | 1 | 2 | 0 | 1 | 1 |
| 1 | 1 | 0 | 2 | 0 | 1 | 1 |
| 1 | 1 | 1 | 3 | 1 | 0 | 1 |
FIG. 6
CARRY
| Z \ XY | 00 | 01 | 11 | 10 |
|---|---|---|---|---|
| 0 | 0 | 0 | 1 | 0 |
| 1 | 0 | 1 | 1 | 1 |
FIG. 7
SUM
| Z \ XY | 00 | 01 | 11 | 10 |
|---|---|---|---|---|
| 0 | 0 | 1 | 0 | 1 |
| 1 | 1 | 0 | 1 | 0 |
INVENTORS
FRED K. BUELOW
DANIEL W. MURPHY
JOHN R. TURNBULL, JR.
BY Lester W. Clark
ATTORNEY FIG. 8
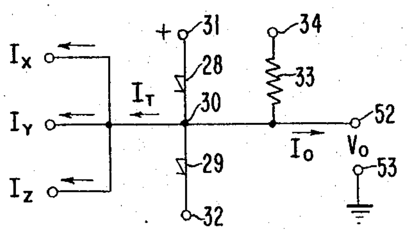
FIG. 10
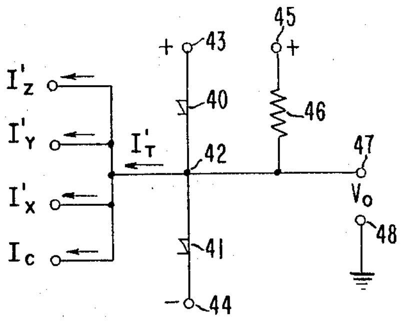
FIG. 9
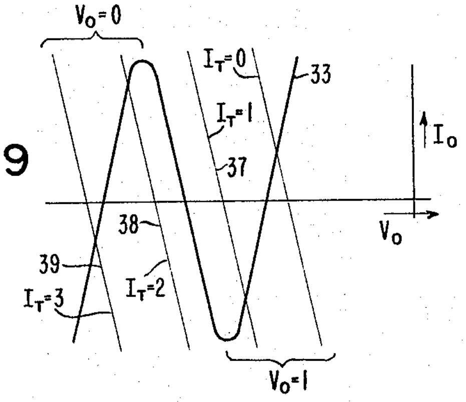
FIG. 12
| $I'_T$ | $I'_T$ | $V_0$ | $\overline{SUM}$ |
|---|---|---|---|
| $I_c+0$ | 2 UNITS | 1 | 1 |
| $I_c+1$ | 3 | 0 | 0 |
| $I_c+1$ | 3 | 0 | 0 |
| 0 +2 | 2 | 1 | 1 |
| $I_c+1$ | 3 | 0 | 0 |
| 0 +2 | 2 | 1 | 1 |
| 0 +2 | 2 | 1 | 1 |
| 0 +3 | 3 | 0 | 0 |
FIG. 11, FIG. 13
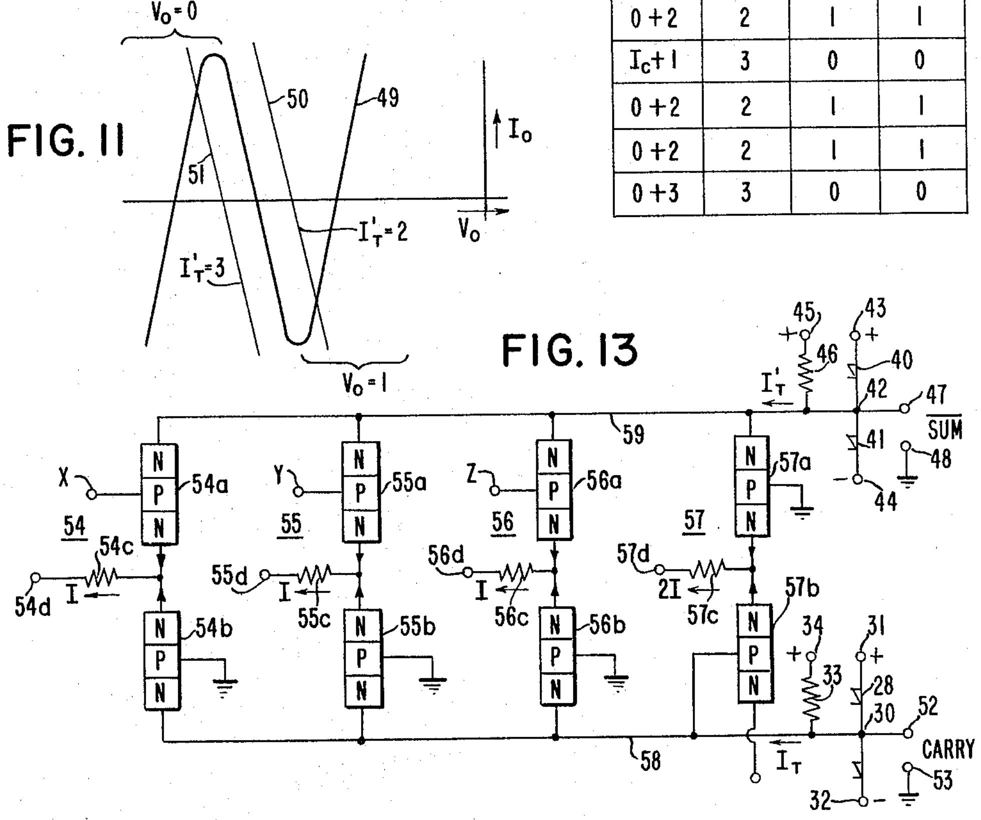

| Y | Z | $I_s$ | $I'_s$ | $V'_o$ | $I_c$ | $I_T$ | $V_o$ |
|---|---|---|---|---|---|---|---|
| 0 | 0 | 0 | 2 | 0 | 2 | 2 | 0 |
| 0 | 1 | 1 | 1 | 1 | 0 | 1 | 1 |
| 1 | 0 | 1 | 1 | 1 | 0 | 1 | 1 |
| 1 | 1 | 2 | 0 | 1 | 0 | 2 | 0 |

| Y | Z | $I_s$ | $I'_s$ | $V'_o$ | $I_c$ | $I_T$ | $V_o$ |
|---|---|---|---|---|---|---|---|
| 0 | 0 | 0 | 2 | 0 | 2 | 2 | 1 |
| 0 | 1 | 1 | 1 | 0 | 2 | 3 | 0 |
| 1 | 0 | 1 | 1 | 0 | 2 | 3 | 0 |
| 1 | 1 | 2 | 0 | 1 | 0 | 2 | 1 |

FIG. 19

| A | B | C | D | OUTPUT REQUIRED BY | | |
|---|---|---|---|---|---|---|
| | | | | m=1 | m=2 | m=3 |
| 0 | 0 | 0 | 0 | 0 | 0 | 0 |
| 0 | 0 | 0 | 1 | 1 | 0 | 0 |
| 0 | 0 | 1 | 0 | 1 | 0 | 0 |
| 0 | 0 | 1 | 1 | 0 | 1 | 0 |
| 0 | 1 | 0 | 0 | 1 | 0 | 0 |
| 0 | 1 | 0 | 1 | 0 | 1 | 0 |
| 0 | 1 | 1 | 0 | 0 | 1 | 0 |
| 0 | 1 | 1 | 1 | 0 | 0 | 1 |
| 1 | 0 | 0 | 0 | 1 | 0 | 0 |
| 1 | 0 | 0 | 1 | 0 | 1 | 0 |
| 1 | 0 | 1 | 0 | 0 | 1 | 0 |
| 1 | 0 | 1 | 1 | 0 | 0 | 1 |
| 1 | 1 | 0 | 0 | 0 | 1 | 0 |
| 1 | 1 | 0 | 1 | 0 | 0 | 1 |
| 1 | 1 | 1 | 0 | 0 | 0 | 1 |
| 1 | 1 | 1 | 1 | 0 | 0 | 0 |

FIG. 24

| $I_T$ | $I'_T$ | $V_T$ | $I_E$ | $I_R$ | $V_o$ |
|---|---|---|---|---|---|
| 0 | 4 | 0 | $k_1$ | $k_1$ | 0 |
| 1 | 3 | 1 | 0 | 1 | 1 |
| 1 | 3 | 1 | 0 | 1 | 1 |
| 2 | 2 | 1 | 0 | 2 | 0 |
| 1 | 3 | 1 | 0 | 1 | 1 |
| 2 | 2 | 1 | 0 | 2 | 0 |
| 2 | 2 | 1 | 0 | 2 | 0 |
| 3 | 1 | 1 | 0 | 3 | 0 |
| 1 | 3 | 1 | 0 | 1 | 1 |
| 2 | 2 | 1 | 0 | 2 | 0 |
| 2 | 2 | 1 | 0 | 2 | 0 |
| 3 | 1 | 1 | 0 | 3 | 0 |
| 2 | 2 | 1 | 0 | 2 | 0 |
| 3 | 1 | 1 | 0 | 3 | 0 |
| 3 | 1 | 1 | 0 | 3 | 0 |
| 4 | 0 | 1 | 0 | 4 | 0 |

FIG. 20 m=1

| AB \ CD | 00 | 01 | 11 | 10 |
|---|---|---|---|---|
| 00 | 0 | 1 | 0 | 1 |
| 01 | 1 | 0 | 0 | 0 |
| 11 | 0 | 0 | 0 | 0 |
| 10 | 0 | 0 | 0 | 0 |

FIG. 21 m=2

| AB \ CD | 00 | 01 | 11 | 10 |
|---|---|---|---|---|
| 00 | 0 | 0 | 1 | 0 |
| 01 | 0 | 1 | 0 | 1 |
| 11 | 1 | 0 | 0 | 0 |
| 10 | 0 | 1 | 0 | 1 |

FIG. 22 m=3

| AB \ CD | 00 | 01 | 11 | 10 |
|---|---|---|---|---|
| 00 | 0 | 0 | 0 | 0 |
| 01 | 0 | 0 | 1 | 0 |
| 11 | 0 | 1 | 0 | 1 |
| 10 | 0 | 0 | 1 | 0 |

m = 1

| NUMBER OF INPUTS UP | 0 | 1 | 2 | 3 | 4 |
|---|---|---|---|---|---|
| $I_T$ (UNITS) | 0 | 1 | 2 | 3 | 4 |
| $\overline{I}_T$ | 4 | 3 | 2 | 1 | 0 |
| $I_E$ | $k_1$ | 0 | 0 | 0 | 0 |
| $I_R$ | $k_1$ | 1 | 2 | 3 | 4 |
| $V_0$ | 0 | 1 | 0 | 0 | 0 |

Oct. 4, 1966 F. K. BUELOW ET AL 3,277,289

LOGIC CIRCUITS UTILIZING A CROSS-CONNECTION BETWEEN COMPLEMENTARY OUTPUTS

Filed Dec. 31, 1963 7 Sheets-Sheet 6

| $I_T$ | $\overline{I}_T$ | $V_T$ | $I_F$ | $I_2$ | $V_{O2}$ |
|---|---|---|---|---|---|
| 0 | 4 | 1 | 0 | 4 | 0 |
| 1 | 3 | 1 | 0 | 3 | 1 |
| 1 | 3 | 1 | 0 | 3 | 1 |
| 2 | 2 | 0 | $k_2$ | $k_2+2$ | 0 |
| 1 | 3 | 1 | 0 | 3 | 1 |
| 2 | 2 | 0 | $k_2$ | $k_2+2$ | 0 |
| 2 | 2 | 0 | $k_2$ | $k_2+2$ | 0 |
| 3 | 1 | 0 | $k_2$ | $k_2+1$ | 0 |
| 1 | 3 | 1 | 0 | 3 | 1 |
| 2 | 2 | 0 | $k_2$ | $k_2+2$ | 0 |
| 2 | 2 | 0 | $k_2$ | $k_2+2$ | 0 |
| 3 | 1 | 0 | $k_2$ | $k_2+1$ | 0 |
| 2 | 2 | 0 | $k_2$ | $k_2+2$ | 0 |
| 3 | 1 | 0 | $k_2$ | $k_2+1$ | 0 |
| 3 | 1 | 0 | $k_2$ | $k_2+1$ | 0 |
| 4 | 0 | 0 | $k_2$ | $k_2$ | 0 |

m = 28

| INPUT UP | 0 | 1 | 2 | 3 | 4 |
|---|---|---|---|---|---|
| $\overline{I}_T$ (UNITS) | 4 | 3 | 2 | 1 | 0 |
| $I_T$ | 0 | 1 | 2 | 3 | 4 |
| $I_F$ | 0 | 0 | $k_2$ | $k_2$ | $k_2$ |
| $I_Q$ | 4 | 3 | $2+k_2$ | $1+k_2$ | $k_2$ |
| $V_{O2}$ | 0 | 1 | 0 | 0 | 0 |

| A | B | C | D | SUM MODULO TWO | $I_E$ | $I_T$ | I | V | $I_F$ | $\bar{I}_T$ | $I_S$ | $V_S$ |
|---|---|---|---|---|---|---|---|---|---|---|---|---|
| 0 | 0 | 0 | 0 | 0 | 2 | 0 | 2 | 1 | 0 | 4 | 4 | 0 |
| 0 | 0 | 0 | 1 | 1 | 0 | 1 | 1 | 1 | 0 | 3 | 3 | 1 |
| 0 | 0 | 1 | 0 | 1 | 0 | 1 | 1 | 1 | 0 | 3 | 3 | 1 |
| 0 | 0 | 1 | 1 | 0 | 2 | 2 | 4 | 0 | 4 | 2 | 6 | 0 |
| 0 | 1 | 0 | 0 | 1 | 0 | 1 | 1 | 1 | 0 | 3 | 3 | 1 |
| 0 | 1 | 0 | 1 | 0 | 2 | 2 | 4 | 0 | 4 | 2 | 6 | 0 |
| 0 | 1 | 1 | 0 | 0 | 2 | 2 | 4 | 0 | 4 | 2 | 6 | 0 |
| 0 | 1 | 1 | 1 | 1 | 0 | 3 | 3 | 1 | 0 | 1 | 1 | 1 |
| 1 | 0 | 0 | 0 | 1 | 0 | 1 | 1 | 1 | 0 | 3 | 3 | 1 |
| 1 | 0 | 0 | 1 | 0 | 2 | 2 | 4 | 0 | 4 | 2 | 6 | 0 |
| 1 | 0 | 1 | 0 | 0 | 2 | 2 | 4 | 0 | 4 | 2 | 6 | 0 |
| 1 | 0 | 1 | 1 | 1 | 0 | 3 | 3 | 1 | 0 | 1 | 1 | 1 |
| 1 | 1 | 0 | 0 | 0 | 2 | 2 | 4 | 0 | 4 | 2 | 6 | 0 |
| 1 | 1 | 0 | 1 | 1 | 0 | 3 | 3 | 1 | 0 | 1 | 1 | 1 |
| 1 | 1 | 1 | 0 | 1 | 0 | 3 | 3 | 1 | 0 | 1 | 1 | 1 |
| 1 | 1 | 1 | 1 | 0 | 2 | 4 | 6 | 0 | 4 | 0 | 4 | 0 |

| AB \ CD | 00 | 01 | 11 | 10 |
|---|---|---|---|---|
| 00 | 0 | 1 | 0 | 1 |
| 01 | 1 | 0 | 1 | 0 |
| 11 | 0 | 1 | 0 | 1 |
| 10 | 1 | 0 | 1 | 0 |

3,277,289
Patented Oct. 4, 1966

3,277,289

LOGIC CIRCUITS UTILIZING A CROSS-CONNECTION BETWEEN COMPLEMENTARY OUTPUTS

Fred K. Buelow, Poughkeepsie, and Daniel W. Murphy and John R. Turnbull, Jr., Wappingers Falls, N.Y., assignors to International Business Machines Corporation, New York, N.Y., a corporation of New York Filed Dec. 31, 1963, Ser. No. 334,730
11 Claims. (Cl. 235—175)

This invention relates to logic circuits utilizing tunnel diodes to secure high speed switching characteristics. The invention is useful in both simple and complex logic functions. It handles signals from a plurality of independent sources with only a single switching operation to produce the necessary logic output.

There is shown and described in the copending application of Fred K. Buelow, Frank B. Hartman and Ernst L. Willette, entitled "Cascade Triggers," Serial No. 219,-929 now Patent Number 3,233,223, filed August 28, 1962, trigger circuits utilizing at each output a pair of forward biased tunnel diodes with a node between the two diodes connected to the output to improve the switching characteristics and output capabilities of the circuits, particularly with respect to shortening the rise times of the output signals and with regard to the output currents available for driving subsequent stages.

There is shown and described in the copending application of David H. Chung and Daniel W. Murphy, entitled "Data Storage Device," Serial No. 265,210, filed March 14, 1963, a data storage circuit utilizing a similar pair of tunnel diodes having the node between the diodes connected to the output of the data storage circuit.

The patent to Richard F. Rutz, No. 3,089,038, shows logic circuits employing the bistable characteristics of tunnel diodes.

An object of the present invention is to provide improved logic circuits utilizing the switching characteristics of biased tunnel diode pairs.

Another object is to provide improved AND and OR circuits.

Another object is to provide an improved full adder circuit including carry and sum circuits.

Another object is to provide an improved EXCLUSIVE OR circuit.

Another object is to provide improved circuits for realizing symmetric logic functions.

Another object is to provide an improved circuit for realizing a sum modulo two function.

The foregoing and other objects of the invention are attained in the several embodiments described herein. In each of the embodiments there is provided a pair of tunnel diodes having a cathode of one diode connected to an anode of the other and to a common node. The anode of the one diode is connected to a source of positive biasing potential and the cathode of the other diode is connected to a source of negative biasing potential. The common node is connected to a current source and is also connected to a plurality of current drains, each controlled by one of several binary data signal sources. The constant current source is weighted with respect to the current values of the several signal inputs so as to switch the bistable pair of tunnel diode between its two stable conditions in accordance with predetermined combinations of the binary data input signals.

One of the modifications of the invention described herein utilizes a single bistable pair of tunnel diodes, and may be designed to serve either as an AND circuit or as an OR circuit.

Certain other modifications of the invention described herein utilize two bistable pairs of tunnel diodes connected with both outputs controlled in response to the same set of signal inputs and a single cross-connection between the two outputs. Certain of these circuits with two bistable pairs may be operated as full adders with a sum function appearing at one output and a carry function appearing at the other output. One of these two output functions is the complement of the true binary function. An arrangement is shown for connecting such a full adder in a multiple order binary adder, utilizing the complement carry of each order as an input for the next higher order.

Another modification of the invention described herein shows a circuit with only two data inputs and a single cross-connection weighted to provide an EXCLUSIVE OR logic function.

Two other modifications described herein include two outputs and a single cross-connection, but the number of inputs is not limited. A system is shown for designing the weighting of the current supplies so that these circuits can produce symmetric logic functions at one of their two outputs.

Still another modification shown herein utilizes two outputs and two oppositely acting cross-connections, with a different system of weighting of the several currents, and produces a sum modulo two function at one of its two outputs.

Other objects and advantages of the invention will become apparent from a consideration of the following specification and claims, taken together with the accompanying drawings.

In the drawings:

FIG. 1 is a wiring diagram of a logic circuit useful as either an AND or OR circuit, and embodying certain features of the invention;

FIG. 2 is a truth table for the circuit of FIG. 1, in both its AND and OR aspects;

FIG. 3 is a graphical illustration of an operating characteristic of the circuit of FIG. 1 when weighted to operate as an AND circuit;

FIG. 4 is a graphical illustration similar to FIG. 3, but illustrating weighting of the circuit so that it serves as an OR circuit;

FIG. 5 is a truth table of a typical full adder circuit;

FIGS. 6 and 7 are Karnaugh maps of the carry and sum functions, respectively, in the truth table of FIG. 5;

FIG. 8 is a wiring diagram of a circuit embodying the invention for producing a carry output for an adder circuit;

FIG. 9 is a graphical illustration of an operating characteristics of the circuit of FIG. 8;

FIG. 10 is a wiring diagram of a circuit embodying the invention for producing a sum function for an adder;

FIG. 11 is a graphical illustration of an operating characteristic of the circuit of FIG. 10;

FIG. 12 is a table illustrating the calculation of the relative weighting which must be utilized in the signal inputs of FIG. 10;

FIG. 13 is a wiring diagram of a full adder circuit embodying the invention;

FIG. 19 is a truth table for a typical symmetric function logic circuit, showing the output required for three different values of $m$;

FIGS. 20, 21 and 22 are Karnaugh maps of symmetric functions where $m=1, 2$ and 3, respectively;

FIG. 23 is a wiring diagram of a circuit embodying the invention for realizing the symmetric functions defined by FIGS. 19 to 22;

FIGS. 24 and 25 are tables illustrating a method of determining the weighting necessary in the signal input circuits of FIG. 23 to produce a particular symmetric logic function;

*FIGS. 1–3*

Figures 14, 15, 16, 17, 18:
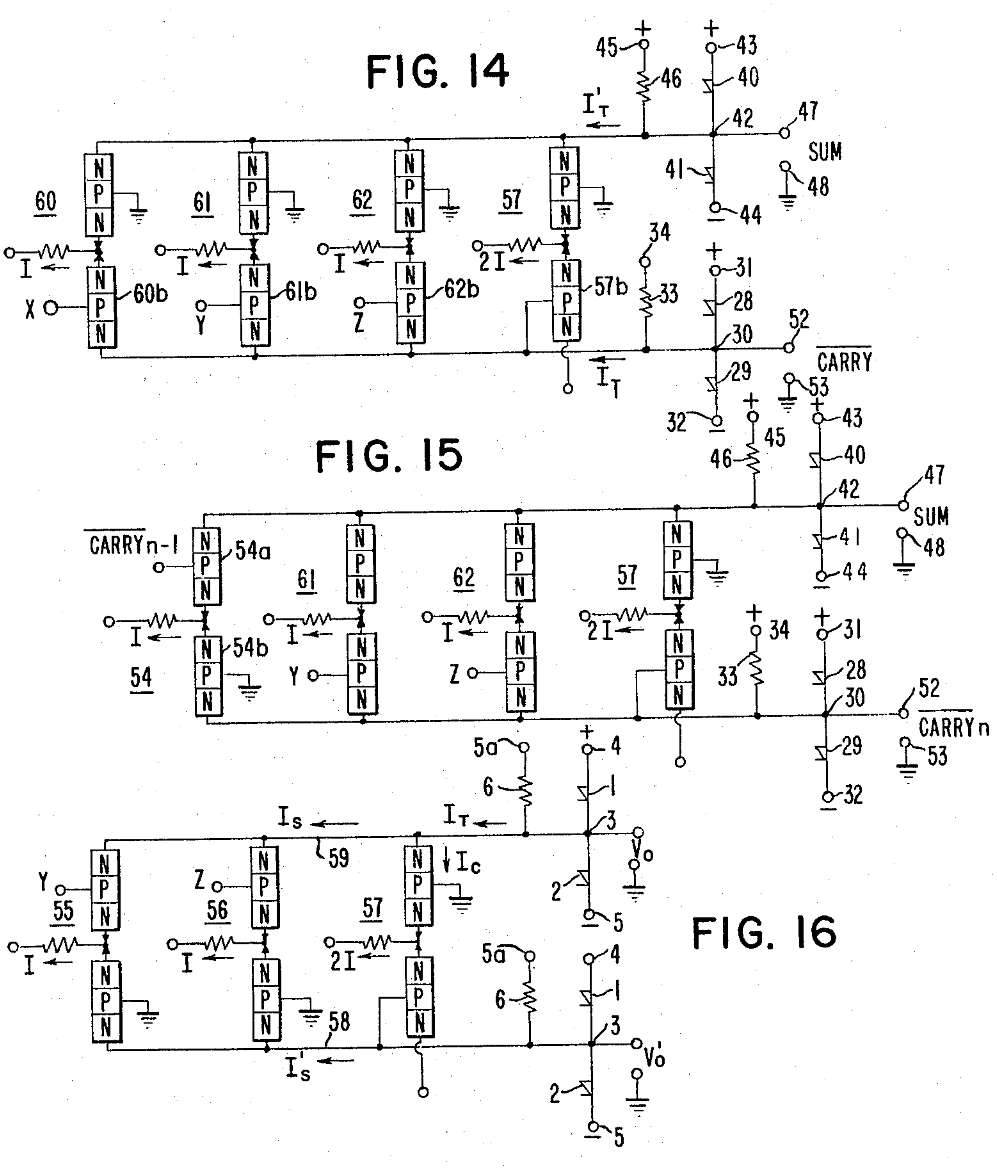
FIGS. 14 and 15 illustrate modified forms of full adder circuits embodying the invention.
FIG. 16 is a wiring diagram of an EXCLUSIVE OR circuit embodying the invention.
FIGS. 17 and 18 are tables illustrating the weighting of the circuit of FIG. 16 to produce the EXCLUSIVE OR function and the complement of the EXCLUSIVE OR function, respectively.

FIG. 1 illustrates a wiring diagram of a logic circuit embodying the invention and operable, by proper design, as either an AND circuit or an OR circuit. This circuit includes a pair of tunnel diodes 1 and 2, having the cathode of diode 1 and the anode of diode 2 connected to a common node 3. The anode of diode 1 is connected to a positive potential supply indicated at 4. The cathode of diode 2 is connected to a negative potential supply indicated at 5. A current course is also connected to the anode 3, including a source of potential 5*a* and a resistor 6 connected between the source 5*a* and the node 3. The node 3 is connected through wires 7 and 8, respectively, to a pair of signal input means generally indicated at 9 and 10.

The signal input means 9 includes a transistor 11 having a collector 11*c*, a base 11*b* and an emitter 11*e*, and a transistor 12 having a collector 12*c*, a base 12*b* and an emitter 12*e*. The emitters 11*e* and 12*e* are connected together at one terminal of a resistor 13 whose opposite terminal is connected to a source of negative potential 14. Collector 12*c* is connected to conductor 7. Base 12*b* is connected to ground. Collector 11*c* is connected to a source of positive voltage 15. Base 11*b* is connected to a source of data input signals 16.

The signal input means 10 similarly includes a pair of transistors 17 and 18 corresponding respectively to the transistors 11 and 12 and connected to similar sources of potential 14 and 15 to a source of data input signals 17. Other electrically equivalent signal input means may alternatively be used.

The node 3 is connected to a signal output terminal 19 cooperating with a grounded signal output terminal 20.

The curve 21 in FIG. 3, shows an operating characteristic of the diode pair 1, 2 in terms of the relationship between the output current $I_O$ and the output potential $V_O$. As indicated in FIG. 1, the output current flows from the node 3 out through the terminal 19. The output potential $V_O$ appears across the terminals 19 and 20.

The curve 21 includes a first region of positive resistance in a potential range identified in FIG. 3 by the assignment to $V_O$ of a nominal value equal to binary 1, and a second region of positive resistance in a potential range identified in FIG. 3 by the assignment to $V_O$ of a nominal value equal to binary 0. Between the two ranges where $V_O$ equals binary 0 and binary 1, respectively, there appears a negative resistance region of the curve 21.

The tunnel diode pair 1, 2 operates stably only in the two positive resistance regions, and is unstable in the negative resistance region. If it is shifted into the negative resistance region, it will pass through it rapidly and stabilize in the other positive resistance region.

There are drawn in FIG. 3 three load lines 22, 23, 24. The load lines 22, 23 and 24 are drawn as is conventional, with a negative slope whose absolute value is equal to the positive resistance of the load resistor 6. The potential of battery 5, shown as $V_L$, determines the point of intersection between the load line, 22 and the $V_O$ axis. The sum of the currents flowing from the anode 3 toward the signal input units 9 and 10, as indicated at $I_T$ in the drawing. Each of the load lines 22, 23 and 24, represents a different value of $I_T$. The load line 22 is drawn for $I_T=0$, the load line 23 is drawn for $I_T=1$, and the load line 24 is drawn for $I_T=2$. Note that the intersection between the load line 22 and the characteristic 21 is in the $V_O=1$ region, while the intersections of the load lines 23 and 24 with the characteristic 21 are both within the $V_O=0$ region.

The truth table of FIG. 2 shows in the two left-hand columns various combinations of input signals which may be received at the terminals 16 and 17. A relatively low potential is assumed to represent a binary 0, and a relatively high potential represents a binary 1. The low and high potentials are at times referred to herein as the down and up potentials, respectively. In the first line of the table, it appears that both of the input terminals 16 and 17 are in their 0 condition, in which case the transistors 11 and 17 are substantially cut off, the transistors 12 and 18 each carry substantial current, represented in the table as one unit of current. The total drain current from the node 3 ($I_T$) is two units. As indicated in FIG. 3, the circuit is operating at the intersection of the two unit load line 24 and the characteristic 21, which is in the 0 binary range for $V_O$. Consequently, a 0 appears in the first line of the table under $V_O$. The other lines of the table in FIG. 2 may similarly be followed. The column headed $V_O$ illustrates the typical AND circuit operation. In other words, the voltage across the output terminal is in the binary 0 range except when both input terminals 16 and 17 are receiving a binary 1 input signal, whereupon the output potential $V_O$ shifts to its binary 1 value.

FIG. 4 illustrates how the circuit of FIG. 1 may be modified for use as an OR circuit. The characteristic 21 is the same as before. The resistor 6 which determines the slope of the load line, is the same as in FIG. 3. This slope, in either FIG. 3 or FIG. 4 must be approximately the same as the slope of the negative resistance region of the characteristic 21, in order to prevent the existence of any load line having two intersections with stable regions of the characteristic 21. The value of $V_L$ is changed between FIG. 3 and FIG. 4. Also, the resistance elements 13 and 13*a* are changed so that the current units are changed. The bias potentials of sources 4 and 5 may also be changed. The three positions of the load line in FIG. 4 are shown at 25, 26 and 27. The load line 25 is drawn for $I_T=0$. The load line 26 is drawn for $I_T=1$ and the load line 27 is drawn for $I_T=2$.

Referring now to Table I, it may be seen that the circuit having the characteristics shown in FIG. 4 operates in the binary 0 region of the output voltage $V_O$ only when the current $I_T=2$ units. When the current $I_T=0$ or 1 unit, the circuit operates in the binary 1 region of output potential $V_O$. This operation is summarized in the right-hand column of FIG. 2, which shows that the output potential is 0 when the current $I_T$ is two units, i.e., when both inputs 16 and 17 are in their binary 0 conditions. For any other of the possible conditions of the inputs 16 and 17, the output potential $V_O$ is in its binary 1 condition. This is typical OR circuit operation.

While reference has been made above to a current source including potential source 5*a* and resistor 6, and the signal input means have been referred to as current drains, it should be recognized by those skilled in the art that the structure disclosed herein as the source may alternatively be used as a drain and that the signal input means may alternatively control current sources. Consequently, in this specification the term "control current carrying means" will be used as generic to the term "drain current carrying means" and the term "supply current carrying means".

*FIGS. 5–13*

FIG. 5 is a truth table for a conventional binary adder circuit having three data inputs respectively identified as X, Y and Z and sum and carry outputs, and also includes columns showing $I_T$ and $I'_T$ for the circuit of FIG. 8. FIGS. 6 and 7 show Karnaugh maps for the carry and sum functions, respectively. FIG. 8 shows in diagrammatic form a circuit constructed in accordance with the invention for producing the carry output function. FIG. 9 shows graphically the operating characteristics of the circuit of FIG. 8.

FIG. 8 includes a pair of tunnel diodes 28 and 29 with the cathode of diode 28 and the anode of diode 29 connected to a node 30. The anode of diode 28 is connected to a source of positive potential indicated at 31. The cathode of diode 29 is connected to a source of negative potential indicated at 32. A load resistor 33 is connected between the node 30 and a source of positive potential 34. The reference characters $V_O$ and $I_O$ and $I_T$ have the same significance which they had in FIGS. 1 to 4. The drain currents from the node 30 to the several signal input means are respectively identified as $I_X$, $I_Y$, and $I_Z$. The sum of those drain currents is $I_T$. The signal input means are not shown in detail, and may be the same as the signal input means 9 and 10 of FIG. 1. An output terminal 52 is connected to node 30 and cooperates with a grounded output terminal 53.

In FIG. 9, the output current-potential operating characteristic for the tunnel diode pair 28, 29 is shown at 35. The load lines respectively corresponding to $I_T=0$, 1, 2 and 3 are shown at 36, 37, 38 and 39. The values of $I_T$ for various combinations of input signals are shown in the column bearing that label in the truth table of FIG. 5. It may be seen that the circuit of FIG. 8, having the characteristic shown in FIG. 9, will produce an output signal $V_O$ shifting between the binary 0 and binary 1 ranges in accordance with the carry column of the truth table in FIG. 5. For example, referring to the first line of that table, the signals X, Y and Z are each a binary 0 and the currents $I_X$, $I_Y$ and $I_Z$ are each one unit so that $I_T$ is equal to three units. The intersection of load line 39 corresponding to $I_T=3$ with the curve 35 then determines the output signal $V_O$, which is in the range where $V_O$ is considered a binary 0, as indicated in FIG. 9. Consequently, 0 appears in the truth table under the "Carry" column.

FIG. 10 shows a circuit for developing the complement (or negation) of the sum shown in FIG. 5. The circuit of FIG. 10 includes two tunnel diodes 40 and 41 having the cathode of diode 40 and the anode of diode 41 connected to a node 42. The anode of diode 40 is connected to a source of positive potential 43. The cathode of diode 41 is connected to a source of negative potential 44. A current source is also connected to the node 42, consisting of a source of positive potential 45 and a resistor 46 connected between source 45 and the node 42. An output terminal 47 is connected to node 42 and cooperates with a grounded output terminal 48. Four current drains respectively labeled $I_C$, $I'_X$, $I'_Y$ and $I'_Z$ are also connected to the node 42. The primed current drains carry current as a function of the complement of the current in the unprimed drains, $I_X$, $I_Y$, $I_Z$ of FIG. 8. The sum of the current drains is shown as $I'_T$ in Fig. 10 and in the tables of FIGS. 5 and 12. In FIG. 12, it is assumed that the current drains $I'_X$, $I'_Y$, $I'_Z$ carry one unit of current when their respective data signals have the binary value 1. $I_C$ flows when the carry output signal of FIG. 8 has the binary value 0. The first column of FIG. 12 shows the value $I'_T$ in terms of an unspecified value $I_C$ plus the sum of the currents flowing in the drains $I'_X$, $I'_Y$ and $I'_Z$. The next problem in designing a circuit according to FIG. 10 is to weight the current $I_C$ with respect to the primed current values so that the second column of the table will appear in units of current which may be made the basis of logical distinction at the output of the circuit of FIG. 10. If $I_C$ is chosen as two units of current, then the total value of $I'_T$ appears as shown in the second column of the table. In that column, if two units of current produces an output signal having the binary value I and three units of current produces an output signal having the binary value 0, then the circuit produces an output signal which is the complement ($\overline{\text{sum}}$) of the binary sum of the inputs. The true sum can be derived from this signal by a suitable inverter circuit.

Referring to FIG. 11, there is shown a curve 49 representing the bistable characteristic of the diode pair 40, 41. On that characteristic 49 are superimposed two load lines 50 and 51, the load line 50 corresponding to $I'_T=2$ and line 51 corresponding to load line $I'_T=3$. It may be seen that whenever $I'_T=2$, the output potential is in the range labeled $V_O=1$, and when $I'_T=3$, the output potential is in the range labeled $V_O=0$.

By way of example, consider the operation of the circuit of FIG. 13 in response to the three input signals indicated in the columns headed X, Y and Z in FIG. 5, line 2. See also FIG. 12, line 2. The signal input means 56 carries one unit of current which is flowing from wire 59 through transistor 56. Wire 58 is carrying two units of current to the signal input means 54 and 55. The carry signal at terminal 52 is at its 0 value and hence the transistor **57*a* of cross-connecting input means 57 is carrying two units of current so that the total current drain ($I'_T$) from node 42 through wire 59 is three units. Consequently, the $\overline{\text{sum}}$ output terminal 47 is in its $V_O=0$ condition, as shown in FIG. 11 where the characteristic 49 crosses the load line 51 for $I'_T=3$. The other lines of FIG. 5 for the circuit of FIG. 13 may be similarly followed, bearing in mind that in each case the signal appearing at the terminal 47** will be the negation of the signal appearing in the sum column of FIG. 5.

FIG. 13 shows the circuits of FIGS. 8 and 9 combined in a full adder circuit having two outputs, one representing the logical carry function and the other output representing the complement ($\overline{\text{sum}}$) of the logical sum function. In FIG. 13, those elements which correspond to elements previously described in connection with FIGS. 8 and 10 have been given the same reference numerals and will not be further described.

The adder circuit of FIG. 13 has three signal input means 54, 55, 56, respectively, connected to signal input terminals X, Y and Z. Each of the signal input means 54, 55, 56, includes two transistors, a load resistor and a current supply terminal designated respectively by *a*, *b*, *c*, and *d* reference characters, e.g., transistors **54*a* and 54*b*, and load resistor 54*c* connecting the emitters of the transistors to current supply terminal 54*d*. The respective signal input means 54, 55, 56, correspond generally to the signal input means 9 and 10** of FIG. 1. Details of these circuits will not be further described.

The adder circuit of FIG. 13 has a fourth signal input means generally indicated at 57 including two transistors **57*a* and 57*b*, a load resistor 57*c* and a current supply terminal 57*d*. The signal input means 57 has the base electrode of transistor 57*a* grounded and the base electrode of transistor 57*b* is connected to a wire 58 which forms an extension of the node 30. The collectors of transistors 54*b*, 55*b* and 56*b* are all connected to the wire 58. The collectors of transistors 54*a*, 55*a*, 56*a* and 57*a* are connected to a wire 59 which forms an extension of the node 42. The signal input means 57*a* responds to the signal at the carry output terminal 52. Its resistor 57*c* and current supply 57*d* are so proportioned with respect to the corresponding parts of the other signal input means 54, 55, 56, that the signal input means 57 carries twice the current of the others, as indicated by the labels 2I and I in the drawing. A signal input means such as 57, having an input terminal connected to one output node (30) of a logic circuit and an output terminal connected to a different output node (42) of the logic circuit, is herein-after referred to as a cross-connecting signal input means. It may be seen that the operation of the diode pairs 28, 29, is the same as that of the corresponding diode pair in FIG. 8, and that the operation of the diode pair 40, 41 is the same as the operation of the corresponding diode pair in FIG. 10. Consequently, the output signal between terminals 52 and 53 is the carry output signal for the three binary inputs X, Y and Z, while the output signals at the terminals 47, 48** is the complement sum ($\overline{\text{sum}}$) for the three binary inputs. The term "sum function" as used in this specification is intended to be generic to sum and $\overline{\text{sum}}$. Similarly, the term "carry function" is generic to carry and $\overline{\text{carry}}$.

*FIG. 14*

FIG. 14 shows a modification of the circuit of FIG. 13 in which the signal inputs X, Y and Z are connected to the base terminals of the respective *b* transistors 60*b*, 61*b* and 62*b* of three signal input means 60, 61 and 62. The parts are otherwise the same as in FIG. 13, and will not be further described. In other words, each of the input signals X, Y and Z acts in the circuit of FIG. 14 as the complement of the corresponding signal in FIG. 13, with the result that the outputs at terminals 47 and 48 represents the true sum rather than the complement sum and the ouput at terminals 52 and 53 represents the complement carry rather than the true carry.

*FIG. 15*

This figure illustrates a modification of the circuit of FIG. 14, which is useful in employing the circuit of FIG. 14 in an adder for a plurality of binary orders. The circuit of FIG. 15 is for the *n*th order. It is the same as the circuit of FIG. 14 except that signal input means 54 replaces signal input means 60, and the input to the signal input means 54 is derived from the complement carry output terminal of the (n—1) order. Thus the carry output terminal 52 for the *n* order is similarly connected to the base of the transistor 54*a* in the adder for the (n+1) order. As long as each order of the adder produces a complement carry signal, and as long as that signal is connected to a complement input of the next higher order, the multiple order adder is entirely consistent within itself, and it is not necessary to invert the carry signals at any time. It should be noted that connecting the carry signal to the base of transistor 54*a* has the effect of inverting the result of that signal with respect to its effect on the circuit as a whole. In other words, connecting the complement carry signal to the base of transistor 54*a* is the same as connecting the carry signal to the base of transistor 54*b*.

*FIGS. 16–19*

These figures illustrate a circuit similar to that of FIG. 13, but modified to serve as an EXCLUSIVE OR circuit. The circuit of FIG. 16 is similar to that of FIG. 13, except that one of the two data inputs is omitted, and the diode pairs are biased differently. The diode pairs in the circuit of FIG. 16 are biased in the same way as the diode pair 1, 2, in the circuit of FIG. 1. Consequently, the same reference numerals have been used for those diode pairs and their biasing potential supplies as were used in FIG. 1. The output current-potential operating characteristic for each of the diode pairs of FIG. 16 is the same as that shown in FIG. 4. In other words, the output potential is in the $V_O=1$ range when the current $I_T=1$ unit and is in the $V_O=0$ range when $I_T=2$ units.

The table of FIG. 17 illustrates the operation of FIG. 16 as an EXCLUSIVE OR circuit. Following line 1 of the table in detail, it may be seen that the inputs Y and Z are at their 0 values so that the current $I_S$ in wire 59 is 0 and the current $I_S$, in wire 58 is 2 units. When the current $I'_S$ is 2 units, the diode pair 1, 2 having its node 3 connected to line 58 is in its 0 output condition. The signal input means 57 responds to that 0 output conditions by drawing 2 units of current $I_C$ from the wire 59. The total current $I_T$ flowing from the node 3 connected to wire 59 is thus 2 units and the node 3 is in its 0 output condition, as shown in FIG. 4 and the right hand column in FIG. 17. The other three lines of FIG. 17 may similarly be followed.

FIG. 18 is a table similar to FIG. 17 in which the EXCLUSIVE OR circuit of FIG. 16 is modified by adjusting the bias values of the diode pairs so that the output terminal produces a signal equal to the negation of the EXCLUSIVE OR function. Note that each term in the right-hand column in FIG. 18 is the opposite of the corresponding term in the right-hand column in FIG. 17. That operation of the circuit in accordance with FIG. 18, the biasing of the $V'_O$ diode pair must be arranged so that the pair is in its $V'_O=1$ condition whenever $I'_S$ is equal to 0 and is switched to its $V_O=0$ condition whenever $I'_S$ is equal to 1. In other words, the output current potential characteristic would be similar to that shown in FIG. 3. At the same time, the biasing of the diode pair 1, 2 connected to wire 59 should be modified to correspond to FIG. 11, wherein the diode pair is in its $V_O=1$ condition for $I_T=2$ and switches to its $V_O=0$ condition for $I_T=3$.

Following the first line of the table of FIG. 18, it may be seen that when both the signal inputs Y and Z are in their 0 value $I_S=0$ and $I'_S=2$. $V'_O$ therefore equals 0 and $I_C=2$ so that $I_T$ also equals 2, thereby producing the output condition of $V_O$ in the binary 1 state. The other three signal input conditions may be similarly followed through the table of FIG. 18. The right-hand column of that figure shows the variation of the output condition to be the inverse of the EXCLUSIVE OR function.

*FIGS. 19 to 25*

These figures illustrate an embodiment of the invention for realizing a logical circuit having an output which varies according to a symmetric function. That is to say, the output has the value of binary 1 when the number of logic inputs that are in their "1" condition is equal to *m* and only *m*, where *m* may vary over a predetermined range.

Figures 23, 25:
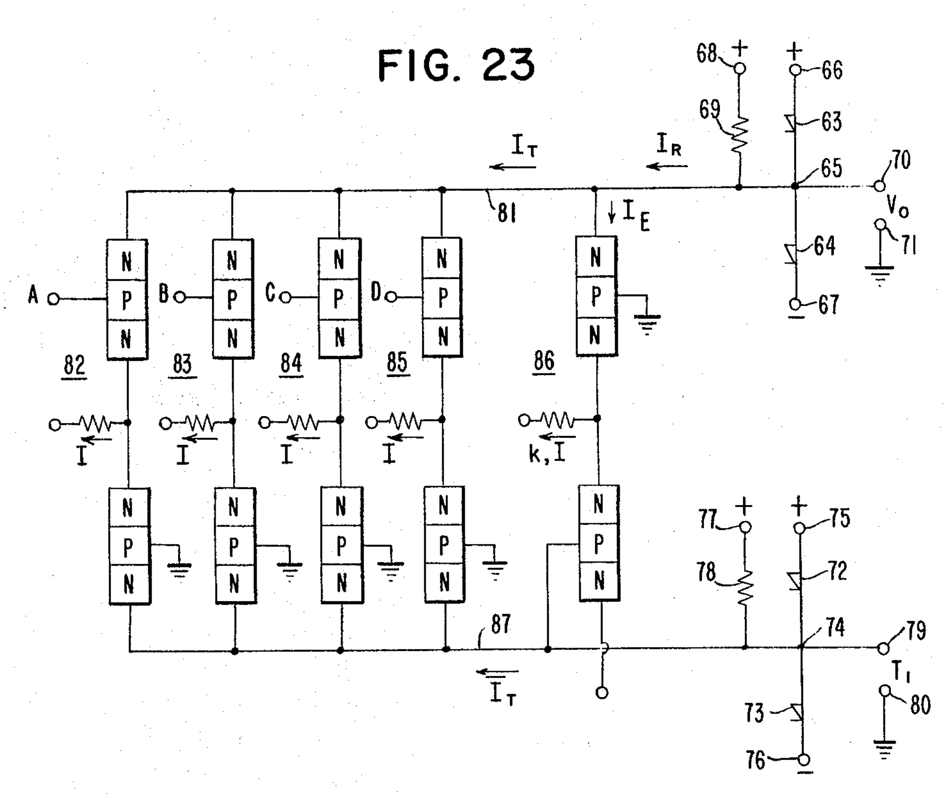

FIG. 19 is a truth table for such a logic circuit having four data inputs, and includes columns for the output signals required for values of *m* equal to 1, 2, or 3, respectively. FIGS. 20, 21 and 22 show corresponding Karnaugh maps for $m=1$, 2, 3 respectively. The wiring diagram of FIG. 23 shows a circuit for performing this function. This circuit includes a tunnel diode pair 63, 64 having the cathode of diode 63 and the anode of diode 64 connected to a common node 65. The anode of diode 63 is connected to a source of positive potential indicated at 66. The cathode of diode 64 is connected to a source of negative potential indicated at 67. A current source includes a source of positive potential 68 and a resistor 69 connecting the source 68 to the node 65. Node 65 is also connected to an output terminal 70 cooperating with a grounded output terminal 71.

A second pair of tunnel diodes 72, 73 are provided with the cathode of diode 72, and the anode of diode 73 connected to a common node 74. The anode of diode 72 is connected to a source of positive potential 75. The cathode of diode 73 is connected to a source of negative potential 76. A current source is provided including a source of positive potential 77 connected through a resistor 78 to the node 74. Node 74 is connected to an output terminal 79 cooperating with a grounded terminal 80.

The node 65 is connected through a wire 81 to one output terminal of each of a set of signal input means 82, 83, 84, 85 and 86. The node 74 is connected through a wire 87 to a complementary output terminal of each of the signal input means 82, 83, 84 and 85 and to an input terminal of the signal input means 86.

Each of the signal input means 82, 83, 84, 85 and 86 corresponds generally to one of the signal input means described in detail at 9 and 10 in FIG. 1, and will not be further described.

In designing a circuit such as that of FIG. 23 to produce a particular symmetric function, the weighting of the current value in the cross-connecting signal input means 86 with respect to the current values in the other signal input means 82 to 85 must be determined. Furthermore, the values of output current flow at which the diode pairs 63, 64 and 72, 73 switch from their $V_O=0$ to their $V_O=1$ conditions must be selected by varying the several bias potentials and thereby the current flowing through the resistors 69 and 78, respectively.

In designing these factors, it is first assumed that the current flow in each of the signal input means 82 to 85 has a unit value of 1. Using this unit value, the first two columns of FIG. 24 can be prepared from the truth table in FIG. 19, with $I_T$ representing the current flow in wire 81 and $\bar{I}_T$ representing the current flow in wire 87. The right-hand column showing the values for $V_O$ is determined from the required output signal. It may then be assumed that the bias values for the diode pair 72, 73 will be selected so that $V_T$ switches from its "0" to its "1" condition when $\bar{I}_T$ switches from four units, which is its maximum value to three units. This assumption results in the completion of the column headed "$V_T$" in FIG. 24. From the information thus obtained, the fourth and fifth columns headed "$I_E$" and "$I_R$" may be completed except for the first line. $I_E$ represents the current flow through the current input means 86. $I_R$ represents the total current drain on the node 65, and its value is known from the column headed $V_T$ that $I_E=0$ for all conditions except those indicated in the first line. Let that value be represented by $k_1$.

If $I_E=k_1$ times the unit current I of the several input means 83, 85, then it only remains to select a value for $k_1$ which will complete the table of FIG. 24 correctly. It may be readily determined by inspection that making $k_1=2$ will make $I_R$ in the first line equal 2 so that the table of FIG. 24 becomes consistent for all input conditions.

It may be seen from the last two columns in the table of FIG. 24 that the diode pair 63, 64 must switch between its "0" and "1" output conditions when the current drain switches between 1 and 2 units. That is to say, the characteristic must be the same as that illustrated in FIG. 4.

The same design factors which were determined by the aid of FIG. 24, can be selected with the aid of the simpler table shown in FIG. 25. The first line of the table is assumed, there being only five possibilities as to the number of inputs up (in their binary 1 conditions). Lines 2 and 3, representing the values of $I_T$ and $\bar{I}_T$, respectively, follow directly from the first line. The last line of the table is known from the particular symmetric function for which the circuit is being designed. It then remains to fill in the $I_E$ and $I_R$ line, noting that $I_R$ in each column is the sum of the $I_E$ figure and the $I_T$ figure. It is apparent that $I_R$ must switch the diode pair 63, 64 between the first and second columns and also between the second and third columns, since $V_O$ switches between those two pairs of columns. The lowest possible value for $k_1$ to complete the table 25 would be 2. Inserting this value in the $I_R$ line, it may be seen that the table will be correct if: (a) this value ($k_1=2$) is also inserted in the $I_X$ line for $k_1$; and (b) if switching of the diode pair 72, 73 takes place between the first and second columns so that all the other numbers in the $I_X$ line are "0," as shown. The selection of values for $k_1$ and of the switching conditions of the diode pair 72, 73 is done empirically by inspection to produce the required output function.

*FIGS. 26–28*

Figures 26, 27, 28:
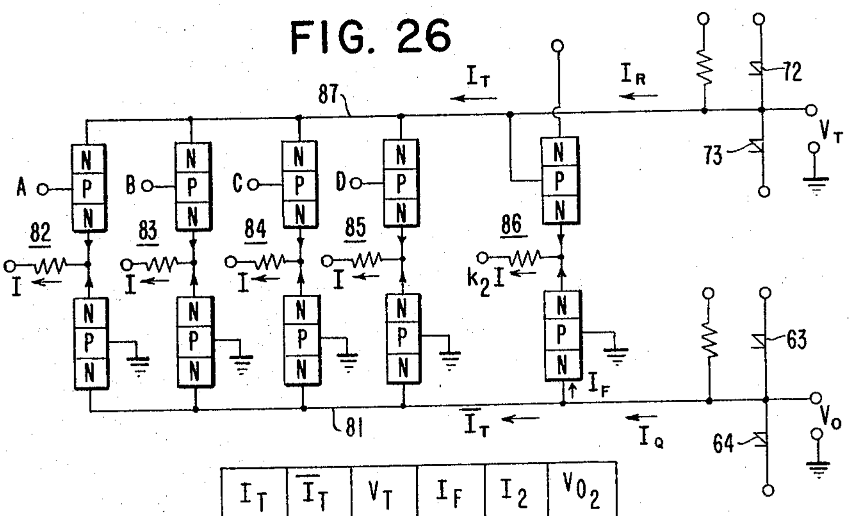
FIG. 26 shows a modified form of circuit for producing a symmetric logic function.
FIGS. 27 and 28 are tables corresponding to FIGS. 24 and 25, respectively, but relating to FIG. 26.

FIGS. 26 to 28 which correspond to FIGS. 23 to 25, respectively, show a modified form of logic circuit, in which the several signal input means are inverted with respect to the cross-coupling signal input means 86. Note that the diode pair 72, 73 is shown as the upper pair in FIG. 26 and the diode pair 73, 74 as the lower pair, the two diode pair positions being inverted from their locations in FIG. 23. The tables in FIGS. 27 and 28 are constructed in accordance with the method outlined above in connection with FIGS. 24 and 25. After these tables are constructed, values of $k_2$ and of the switching points of the two diode pairs are selected to complete the tables. In order for these tables to be correctly completed, $k_2$ must be equal at least 4. It is of course preferable to select the smallest possible number for $k_2$ in order to minimize the current values. Note that in the lines $I_R$ and $I_Q$ of FIGS. 25 and 28, respectively, the diode pair 63, 64 must always switch on both sides of the column corresponding to the "1" value of $m$ for which an output is desired. In the line labeled $\bar{I}_T$ (FIG. 25) or $I_T$ (FIG. 28) which determines the switching in the other diode pair, the switching must take place on one side or the other, but not both sides, of the same column. In FIG. 25, the latter switching takes place between the first and second columns. In FIG. 28, the corresponding switching takes place between the second and third columns. For any particular function, the circuit of FIG. 23 may in some cases be preferable to that of FIG. 26, and vice versa. Generally speaking, the circuit of FIG. 23 is better for low values of $m$ and the circuit of FIG. 26 is better for high values.

Figures 29, 30, 31:
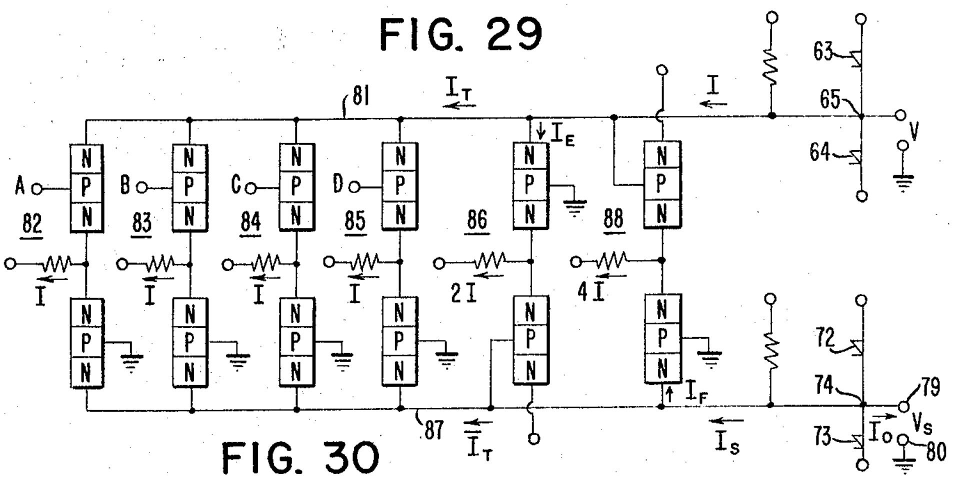
FIG. 29 is a wiring diagram of a circuit embodying the invention for realizing a sum modulo two logic function.
FIG. 30 is a truth table for FIG. 29, combined with a table showing the determination of the weighting for use in the circuit of FIG. 29.
FIG. 31 is a Karnaugh map of the sum modulo two function realized by the circuit of FIG. 29.

*FIGS. 29 to 31*

These figures illustrate a circuit similar to that of FIGS. 23 and 26 for producing a sum modulo two output function. FIG. 29 is a wiring diagram of the circuit. FIG. 30 is a truth table for the circuit with added columns showing various current and potential values, as labeled. FIG. 31 is a Karnaugh map of the sum modulo two output function. The circuit of FIG. 29 is similar to that of FIG. 23, with the addition of a second cross-coupling signal input means 88. It is to be noted that the signal input means 86 acts as a current drain on the wire 81 and hence on the node 65, while the signal input means 88 acts as a current drain on the wire 87 and hence on the node 74. The sum modulo two output appears at the output terminals 79, 80.

The sum modulo two is a well-known logic function consisting of the output from a number of independent inputs taken in pairs according to the rule that if both inputs are the same in a pair, the sum modulo two of that pair is "0." If the two inputs in a pair are different, then the sum modulo two is a binary "1." Where more than one pair is involved, the sum modulo two of each pair is taken separately, and then the sum of the two sums so obtained is determined. For example, in the second row of table 30, the sum modulo two of inputs A and B is "0," since they are both alike. The sum modulo two of inputs C and D is "1," since C and D are different. The sum modulo two of all four inputs taken together is "1" since the sum modulo two of A and B is different from the sum modulo two of C and D. The correct sum modulo two is indicated in the column bearing that heading.

In the circuit of FIG. 29, each of the diode pairs 63, 64 and 72, 73 is designed to switch between an output current of three units and an output current of four units. The cross-coupling signal input 86 is designed to carry two units of current and the cross-coupling unit 88 is designed to carry four units of current, as indicated by the labels in the drawing.

Carrying through the second line of the table in FIG. 30, the total number of inputs which are up determines the current $I_T$ as being equal to that number and the current $\overline{I}_T$ as being equal to the sum of all the inputs which are down. As shown in the table, these are respectively determined to be "1" and "3." $I_T$ determines that the current $I_E$ shall be "0," since the input signal to the input means 86 is up. Similarly, $\overline{I}_T$ determines that $I_F$ is "0" since the signal input to the cross-coupling means 88 is also up. The current I represents the sum of $I_T$ and $I_E$. The current $I_S$ represents the sum of $I_F$ and $\overline{I}_T$. The switchover point of the output voltage $V_S$ in response to the current I is arbitrarily selected to make the current $I_S$ switch the diode 72, 73 as required to produce the output signal $V_S$. In the circuits shown in FIG. 29, each of the diode pairs 63, 64 and 72, 73 switches between a drain current of three units and a drain current of four units. That is to say, a drain current of three units or less corresponds to an output potential in the binary "1" range, while a current of four units or more corresponds to an output potential in the binary "1" range.

While we have shown and described certain preferred embodiments of our invention, other modifications thereof will readily occur to those skilled in the art, and we therefore intend our invention to be limited only to the appended claims.

We claim:

1. A logic circuit, comprising:

(a) first and second bistable pairs of tunnel diodes, each pair comprising:
   (1) a node connected to an anode of one diode and a cathode of the other;
   (2) a positive potential source connected to the anode of the other diode; and
   (3) a negative potential source connected to the cathode of said one diode;

(b) first and second output current carrying means connected respectively to the nodes of the first and second pairs;

(c) first and second control current carrying means connected respectively to the nodes of the first and second pairs;

(d) a plurality of logic signal input means, each having a signal input shiftable between two signal conditions of opposite binary significance, and current carrying output means controlled by said signal input, a first one of said logic signal input means having its signal input connected to one of said nodes; and (e) means connecting selected combinations of said current carrying output means respectively to said first and second control current carrying means, said connecting means including a connection between the other of said nodes and the current carrying output means of said first logic signal input means.

2. A logic circuit as defined in claim 1, in which:

(a) said logic signal input means includes second and third signal input means, each having an input connected to a source of independent signals and two complementary current carrying outputs of opposite binary significance;

(b) said connecting means includes connections between said one node and one current carrying output of each of said second and third signal input means and connections between the other node and the other current carrying output of each of said second and third signal input means; and (c) said one signal input means is weighted with respect to said second and third signal input means so that one of said nodes shifts between its stables states in accordance with an EXCLUSIVE OR function of said second and third signal input means.

3. A logic circuit as defined in claim 1, in which:

(a) said logic signal input means includes second, third and fourth signal input means, each having an input connected to an independent source of binary signals to be added and two complementary current carrying outputs of opposite binary significance;

(b) said connecting means includes connections between said one node and one current carrying output of each of said second, third and fourth signal input means, and connections between the other node and the other current carrying output of each of said second, third and fourth signal input means; and (c) said one signal input means is weighted with respect to said second, third and fourth signal input means so that one of said nodes shifts between its stable states in accordance with a sum function of said second, third and fourth signal inputs and the other node shifts between its stable states in accordance with a carry function of said second, third and fourth signal inputs.

4. A logic circuit as defined in claim 3, in which said sum function represents the complement of the true binary sum and said carry function is the true binary carry.

5. A logic circuit as defined in claim 3, in which said sum function is the true binary sum and said carry function is the complement of the true binary carry.

6. A logic circuit as defined in claim 1, in which:

(a) said logic signal input means includes a plurality of data signal input means, each having an input connected to an independent source of binary signals and two complementary current carrying outputs of opposite binary significance;

(b) said connecting means includes connections between said one node and one current carrying output of each of said data signal input means, and connections between the other node and the other current carrying output of said data signal input means; and (c) said one signal input means is weighted with respect to said data signal input means so that one of said nodes shifts between its stable states in accordance with a symmetric function of said data signal inputs.

7. A logic circuit as defined in claim 1, including a second logic signal input means having its signal input connected to the other of said nodes and its current carrying output means connected to said one node.

8. A logic circuit as defined in claim 7, in which:

(a) said logic signal input means includes a plurality of data signal input means, each having an input connected to an independent source of binary signals and two complementary current carrying outputs of opposite binary significance;

(b) said connecting means includes connections between said one node and one current carrying output of each of said data signal input means, and connections between the other node and the other current carrying output of said data signal input means; and (c) said first and second signal input means are weighted with respect to said data signal input means so that one of said nodes shifts between its stable states in accordance with the sum modulo two of said data signal inputs.

9. A logic circuit, comprising:

(a) a plurality of signal input means, each having an input connected to an independent source of binary signals and two complementary current carrying outputs of opposite binary significance;

(b) two bistable output means, one having an input connected to one current carrying output of each of said signal input means and the other having a signal input connected to the other current carrying output of each of said signal input means;

(c) cross-connecting means having an input connected to one of said bistable output means and an output connected to the other bistable output means; and (d) means weighting said cross-connecting means with respect to said signal input means so that one of said bistable output means is established in one of its stable conditions in response to a first predetermined combination of signal conditions at said inputs and is established in its other stable condition in response to a second predetermined combination of signal conditions at said inputs, so as to distinguish logically between said first and second combinations.

10. A binary full adder circuit, comprising:

(a) three signal input means, each having an input connected to an independent source of binary signals to be added and two complementary current carrying outputs of opposite binary significance;

(b) two bistable output means, one having an input connected to one current carrying output of each of said signal input means and the other having a signal input connected to the other current carrying outputs of said three signal input means;

(c) cross-connecting means having an input connected to one of said bistable output means and an output connected to the other bistable output means; and (d) means weighting said cross-connecting means so that said one of said bistable output means shifts between its stable states in accordance with a sum function of said three input means and the other bistable output means shifts between its stable states in accordance with a carry function of said three signal input means.

11. Adding apparatus for a plurality of binary orders, comprising:

(a) a full adder for each of said orders, each adder including:

(1) three signal input means, each having an input connected to an independent source of binary signals to be added;

(2) means responsive to said three signal input means to produce two bistable outputs, one of said bistable outputs shifting between its stable states in accordance with a true binary sum of said three input means and the other bistable output shifting between its stable states in accordance with the complement of the true binary carry of said three signal input means; and (3) one of said signal input means is connected to respond inversely to the signals at its input; and (b) means connecting the other bistable output of each full adder to the inversely responding input means of the next higher order.

References Cited by the Examiner

UNITED STATES PATENTS

| | | | |
|---|---|---|---|
| 3,194,974 | 7/1965 | Rymaszewski | 235—175 |
| 3,201,608 | 8/1965 | Chung | 307—88.5 |
| 3,210,568 | 10/1965 | Dunnet | 307—88.5 |

MALCOLM A. MORRISON, *Primary Examiner.*

I. FAIBISCH, *Assistant Examiner.*